US006717688B1

(12) United States Patent
Ogawa

(10) Patent No.: US 6,717,688 B1
(45) Date of Patent: Apr. 6, 2004

(54) COMMUNICATION APPARATUS AND COMMUNICATION METHOD

(75) Inventor: Hidehiko Ogawa, Yokohama (JP)

(73) Assignee: Panasonic Communications Co., Ltd., Fukuoka (JP)

(*) Notice: Subject to any disclaimer, the term of this patent is extended or adjusted under 35 U.S.C. 154(b) by 0 days.

(21) Appl. No.: 09/257,257

(22) Filed: Feb. 25, 1999

(30) Foreign Application Priority Data

Mar. 2, 1998 (JP) .............................................. 10-66226

(51) Int. Cl.$^7$ .............................................. G06F 15/00
(52) U.S. Cl. ...................... 358/1.15; 358/402; 358/403; 358/404; 379/100.01
(58) Field of Search ................................ 358/1.15, 402, 358/403, 404, 444, 440, 434, 468, 442, 407; 379/100.01

(56) References Cited

U.S. PATENT DOCUMENTS

| 5,115,326 | A | | 5/1992 | Burgess et al. | |
|---|---|---|---|---|---|
| 5,206,743 | A | * | 4/1993 | Hochman et al. | 358/440 |
| 5,267,303 | A | * | 11/1993 | Johnson et al. | 379/100 |
| 5,483,352 | A | * | 1/1996 | Fukuyama et al. | 358/402 |
| 5,530,907 | A | * | 6/1996 | Pavey et al. | 395/889 |
| 5,539,530 | A | * | 7/1996 | Reifman et al. | 358/402 |
| 5,764,906 | A | * | 6/1998 | Edelstein et al. | 395/200.49 |
| 5,872,641 | A | * | 2/1999 | Ozeki et al. | 358/434 |
| 5,881,233 | A | | 3/1999 | Toyoda et al. | 395/200.48 |
| 5,953,505 | A | | 9/1999 | Chida | |
| 5,982,507 | A | * | 11/1999 | Weiser et al. | 358/402 |
| 6,005,677 | A | * | 12/1999 | Suzuki | 358/442 |
| 6,061,502 | A | * | 5/2000 | Ho et al. | 395/114 |
| 6,097,797 | A | * | 8/2000 | Oseto | 379/100.08 |
| 6,104,500 | A | * | 8/2000 | Alam et al. | 358/1.15 |
| 6,233,318 | B1 | * | 5/2001 | Picard et al. | 379/88.17 |
| 6,310,942 | B1 | * | 10/2001 | Bashoura et al. | 379/100.14 |

FOREIGN PATENT DOCUMENTS

| EP | 0465011 | 1/1992 |
|---|---|---|
| EP | 0812100 | 12/1997 |
| JP | 2-268557 | 11/1990 |
| JP | 3-289756 | 12/1991 |
| JP | 7-74916 | 3/1995 |
| JP | 7-336462 | 12/1995 |
| JP | 11196252 | 7/1999 |
| JP | 11234468 | 8/1999 |
| WO | 96/41463 | 12/1996 |

OTHER PUBLICATIONS

English Language Abstract of JP 2–268557.
English Language Abstract of JP 7–336462.
English Language Abstract of JP 3–289756.
English Language Abstract of JP 7–74916.
An English Language abstract of JP 11–196252.
An English Language abstract of JP 11–234468.

* cited by examiner

Primary Examiner—Mark Wallerson
(74) Attorney, Agent, or Firm—Greenblum & Bernstein, P.L.C.

(57) ABSTRACT

A data receiving station inserts a polling request identifier and the request file number in a user area of a mail address of <forward-path> in a RCPT command to transmit according to SMTP. A network facsimile apparatus recognizes the polling request identifier and the request file number from the received <forward-path> to decide. When the polling request is present, the network facsimile apparatus transmits the request file data corresponding to the request file number to the data receiving station. The internet facsimile apparatus thus transmits stored image data to the data receiving station according to a request from the data receiving station. It is thereby possible to perform a polling communication.

11 Claims, 8 Drawing Sheets

MAIL COMMAND
MAIL<SP>FROM:<reverse-path><CRLF>

RCPT COMMAND
RCPT<SP>TO:<forward-path><CRLF>

EXAMPLE OF forward-path

COMMUNICATION APPARATUS AND COMMUNICATION METHOD

BACKGROUND OF THE INVENTION

1. Field of the Invention

The present invention relates to a communication apparatus, such as an internet facsimile apparatus, and a communication method for performing a polling communication.

2. Description of the Related Art

As a procedure for transmitting data stored in a facsimile apparatus at an answering site according to a request from a data receiving station, a polling communication utilizing public switching telephone networks (PSTN) and others has been known. Usually, when the polling communication is performed, the data receiving site gives a call to the answering site to transmit a polling command, polling password and others. The answering site transmits the required data to the data receiving station. In a facsimile communication, it is possible for an unspecified data receiving station to draw out pre-registered data using this polling procedure. In addition, it is also possible to ensure the secrecy by a protection such as a password or the like depending on the necessity.

However, in a facsimile apparatus for transmitting and receiving data via the internet, so-called, "internet facsimile" or "network facsimile", the apparatus transmits and receives image data as an Email using a communication protocol for a message transfer such as SMTP (Simple Mail Transfer Protocol). Since the transmission and reception are thereby performed asynchronously, it is not possible to use an usual polling procedure.

In addition, in the internet, it is possible to easily detect and analyze data stored in a LAN, which is different from the PSTN. Because of it, a conventional polling password is not enough to ensure the secrecy.

SUMMARY OF THE INVENTION

A first object of the present invention is to provide a communication apparatus for enabling a polling communication via the internet with an enough secrecy ensured.

A second object of the present invention is to provide a communication method for enabling a polling communication via the internet with an enough secrecy ensured.

The aforementioned objects can be achieved by a communication apparatus comprising: memory means for storing image data; reception means for receiving recipient information according to a message transfer protocol of electronic mail; decision means for deciding whether or not an identifier indicating a transfer request is contained in the received recipient information; and transmission means for transmitting image data stored in said memory means when said decision means decides that said identifier is contained.

The aforementioned objects can be achieved by a facsimile apparatus comprising: scanning means for scanning an original to obtain image data; memory means for storing said image data obtained by said scanner; reception means for receiving recipient information according to a message transfer protocol of electronic mail; decision means for deciding whether or not an identifier indicating a transfer request is contained in the received recipient information; and transmission means for transmitting image data stored in said memory means when said decision means decides that said identifier is contained.

The aforementioned objects can be achieved by a method for communicating image data comprising the steps of: transmitting from a sender side recipient information containing an identifier indicating a transfer request according to a message transfer protocol of electronic mail; deciding at a receiving side whether or not an identifier indicating said transfer request is contained in the received recipient information; and transmitting image data stored when it is decided that said identifier is contained.

BRIEF DESCRIPTION OF THE DRAWINGS

Other objects and further features of the present invention will be apparent from the following detailed description when read in conjunction with the accompanying drawings, in which.

DETAILED DESCRIPTION OF THE PREFERRED EMBODIMENT

The embodiment of the present invention is explained below with reference to the drawings.

Figure 1:
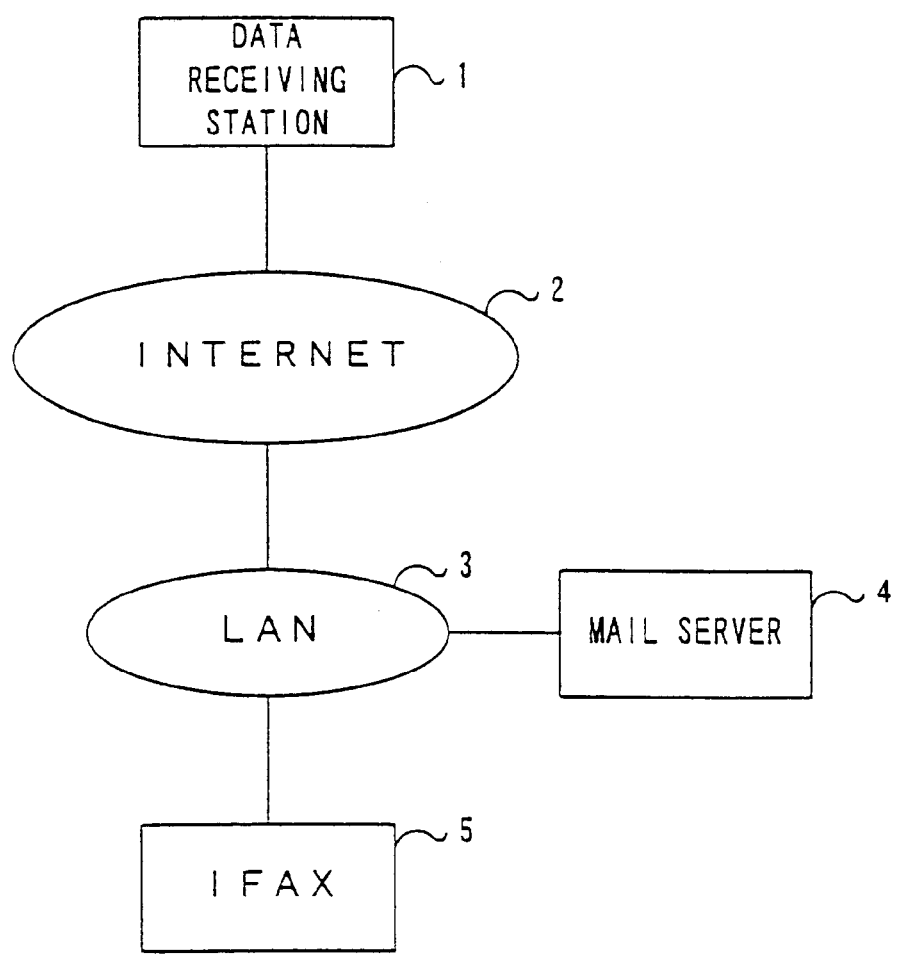
FIG. 1 is a network configuration diagram of a polling communication using an internet facsimile apparatus according to the embodiment of the present invention.

FIG. 1 is a network configuration diagram of a polling communication using a communication apparatus according to the embodiment of the present invention.

In FIG. 1, a data receiving station 1 for performing a polling request performs the polling communication with an internet facsimile apparatus (E-mail type facsimile apparatus) 5 through a mail server 4 put in a LAN 3 via the internet 2.

Figure 2:
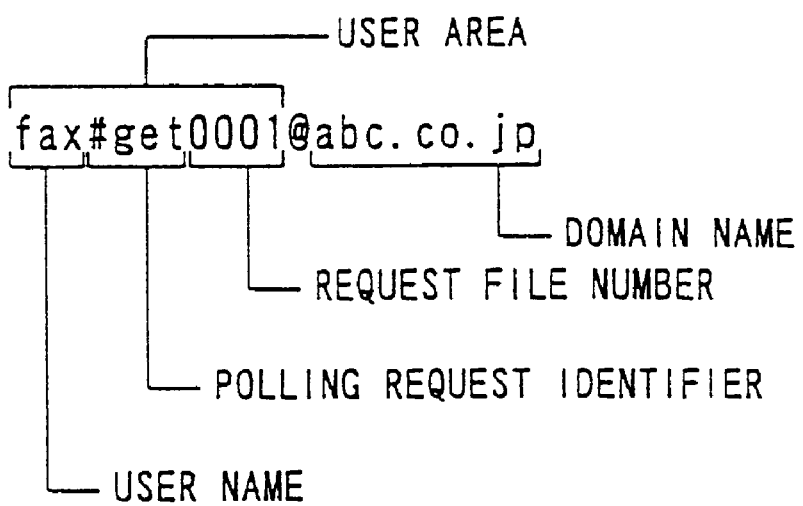
FIG. 2 is a diagram illustrating an example of a SMTP command in the above embodiment.

The data receiving station 1 is, for example, a personal computer (hereinafter referred to as PC) with E-mail communication software installed. The data receiving station 1 transmits sender information and recipient information to the internet facsimile apparatus 5 according to SMTP that is a message transfer protocol. As illustrated in FIG. 2, the data receiving station 1 transmits <reverse-path> of a MAIL command containing a mail address of the data receiving station 1. Further, the data receiving station 1 inserts a polling request identifier (hereinafter simply referred to as identifier) and a request file number into a mail address of the internet facsimile apparatus 5 contained in <forward-path> of a RCPT command. In more detail, as illustrated in FIG. 2, the identifier "#get" and the request file number "0001" are inserted after a user name in a user area of the mail address.

The data receiving station 1 transmits a MAIL command and the RCPT command that are illustrated in FIG. 2, a DATA command and others to the internet facsimile apparatus 5 via the mail server 4.

In addition, the data receiving station 1 may be an internet facsimile apparatus for performing a facsimile communication via the internet.

The mail server 4 stores an E-mail transmitted from the data receiving station 1 and others temporarily to distribute to the internet facsimile apparatus 5 and other terminals.

Figure 3:
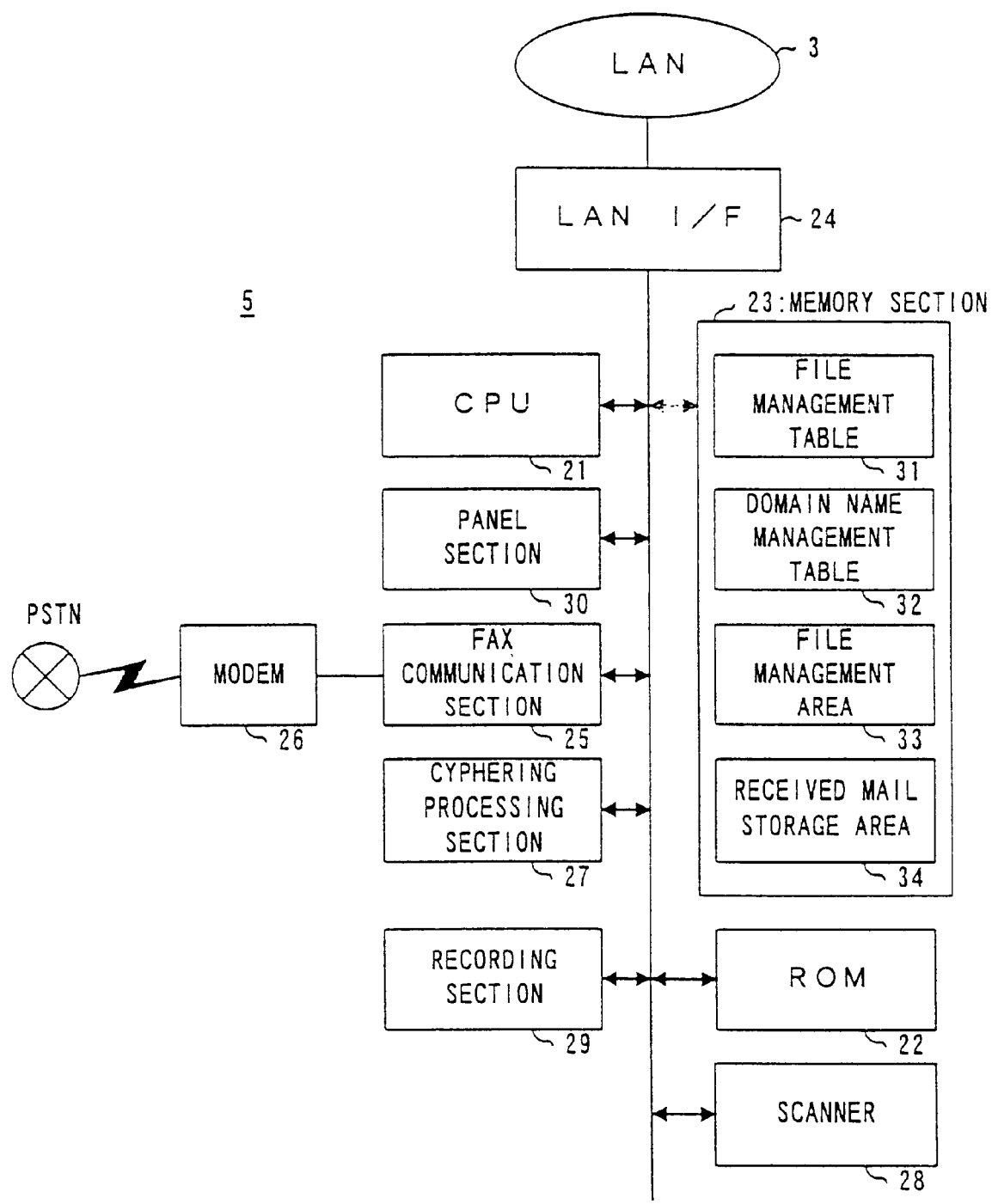
FIG. 3 is a block diagram of the internet facsimile apparatus according to the above embodiment.

Next, a configuration of the internet facsimile apparatus 5 is explained with reference to FIG. 3. FIG. 3 is a block diagram of an internet facsimile apparatus according to this embodiment. In FIG. 3, the internet facsimile apparatus comprises a CPU 21 for performing a control over recognition of various information, decision, and others, a ROM 22 to store a program, a memory section 23 to store various data such as a received mail and a data file, a LAN interface section 24 for performing a procedure that is necessary to transmit data by E-mail, a facsimile communication section 25 for transmitting and receiving data by facsimile communication, a modem 26 for performing modulation/demodulation processing in transmitting and receiving data via the PSTN, a cypher processing section 27 for performing cypher processing of data, a scanner 28 for capturing an image, a printing section 29 for outputting received data, and a panel section 30 to perform an operation.

The memory section 23 comprises a file management table 31, a domain name management table 32, a file storage area 33 and a received mail storage area 34

Recipient information transmitted from the data receiving station 1 is received by the LAN interface section 24 via the LAN 3. The CPU 21 decides whether or not the identifier indicating the polling request is contained in the received recipient information. When the identifier is contained, the CPU 21 decides a request file registered in the file management table 31 based on a request file number. Then, based on the decision result, the CPU 21 reads the request file from the file storage area 33, and transmits the request file to the data receiving station by E-mail.

Herein, the recipient information is given to a recipient side from a sender side to specify the recipient side. A communication apparatus at the recipient side decides whether or not it is possible to respond according to the recipient information. Specifically, the recipient information may be a mail address. The mail address is capable of containing an identifier at a user area. More specifically, in SMTP, the recipient information may be generated by inserting an identifier following a user name of <forward-path> of the RCPT command.

On the other hand, the sender information is given to the recipient side from the sender side to specify the sender. The communication apparatus at the recipient side decides whether or not it is possible to respond according to the sender information. Specifically, the sender information may be a mail address of the sender. More specifically, in SMTP, the sender address may be a domain name of <reverse-path> of the MAIL command. A decision section, for example, permits a transmission of image data without cyphering when a domain name matches a pre-registered one, while transmits image data after cyphering or refuses to respond when a domain name does match a pre-registered one.

Figure 4:
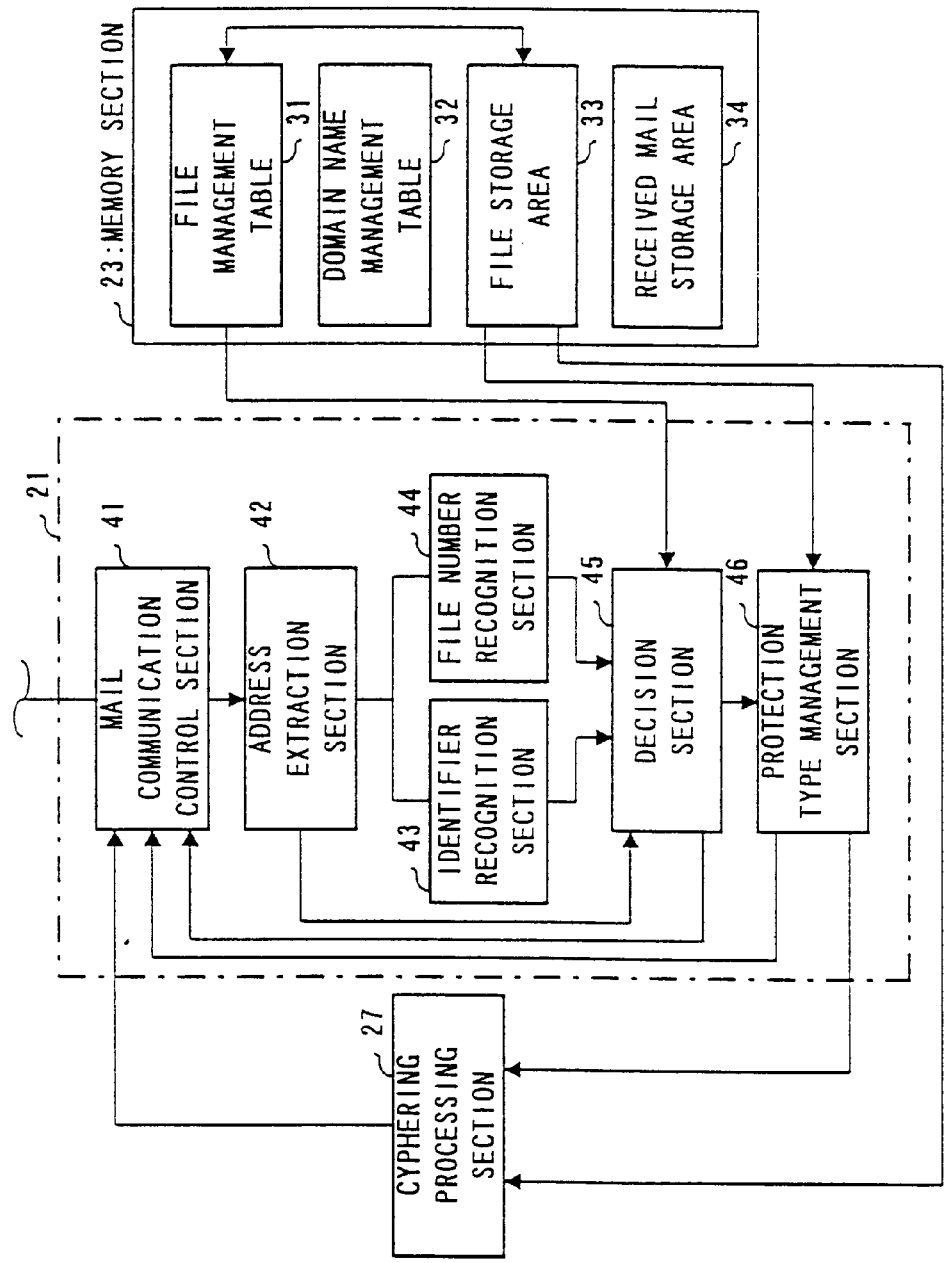
FIG. 4 is a block diagram illustrating a primary configuration of the internet facsimile apparatus according to the above embodiment;.

Next, a polling communication processing control executed by the CPU 21 of the internet facsimile apparatus is explained specifically with reference to FIG. 4. FIG. 4 is a block diagram illustrating a primary configuration of the internet facsimile apparatus according to this embodiment.

A mail communication control section 41 controls a transmitting/receiving procedure of E-mail according to SMTP. The mail communication control section 41 receives the MAIL command and the RCPT command according to SMTP from the data receiving station 1, and receives E-mail data when a response is possible,.

In addition, an address extraction section 42 extracts a mail address of a recipient from <forward-path> of the RCPT command received by the mail communication control section 41 to transmit to an identifier recognition section 43 and a file number recognition section 44. Further, the address extraction section 42 extracts a mail address of a sender from <reverse-path> of the MAIL command to transmit to a decision section 45.

The identifier recognition section 43 recognizes the identifier "#get" inserted in the mail address of a recipient site. On the other hand, the file number recognition section 44 recognizes the file number "xxxx" inserted in the mail address. The identifier recognition section 43 and the file number recognition section 44 transmit these recognition results respectively to the decision section 45.

The decision section 45 decides the request file and a protection type of the file referring to the file management table 31 and the domain name management table 32 in the memory section 23. When the decision results indicates that a response is possible, the decision section 45 orders a protection type management section 46 to execute processing.

In addition, the protection type as the simplest example indicates, for example, that it is possible or impossible to transmit. Requested image data are transmitted when it is possible to transmit, while not transmitted when it is impossible to transmit. Further, the protection type indicates that it is necessary to cypher, and others.

The protection type management section 46 reads the request file data from the file storage area 33. When a cyphering is necessary corresponding to the decided protection type, the protection type management section 46 transmits the request file data to the cyphering processing section 27. On the other hand, when the cyphering processing is not necessary, the protection type management section 46 transmits the request file data to the mail communication control section 41 without processing.

The cyphering processing section 27 executes a predecided cyphering processing of the request file and transmits the cyphered request file to the mail communication control section 41. The cyphering processing section 27 cyphers data according to variety of cyphering method, such as S/MIME, PGP and the others.

Figure 5:
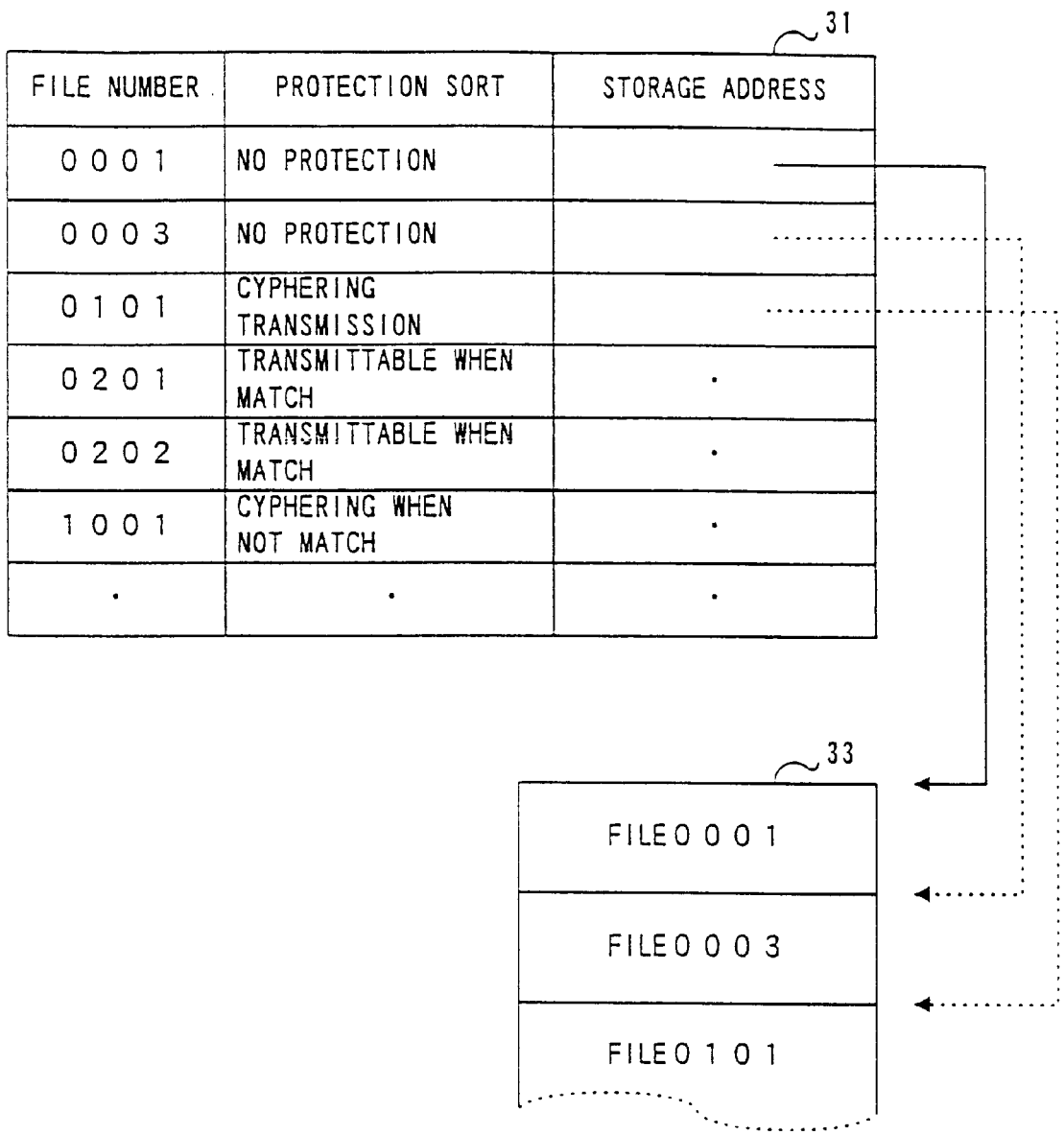
FIG. 5 is a schematic diagram illustrating a file management table and a file storage area in the above embodiment.

FIG. 5 is a schematic diagram illustrating the file management table 31 and the file storage area 33 described above. In the file management table 31, a file number, the protection type and a storage address of the file storage area 33 are registered in correlation with each other. For example, for the file number of "0001", the protection type is "no protection" and a storage address of file data "0001" in the file storage area 33 is registered.

A registration of a file data to the file storage area 33 is executed by scanning an original with the scanner 28 illustrated in FIG. 3 to convert into image data, and then compressing the image data into an image compression file such as a MH file. Further, a plurality of the image compression files is converted to a TIFF file to register at a storage address of the file storage area 33.

Figure 6:
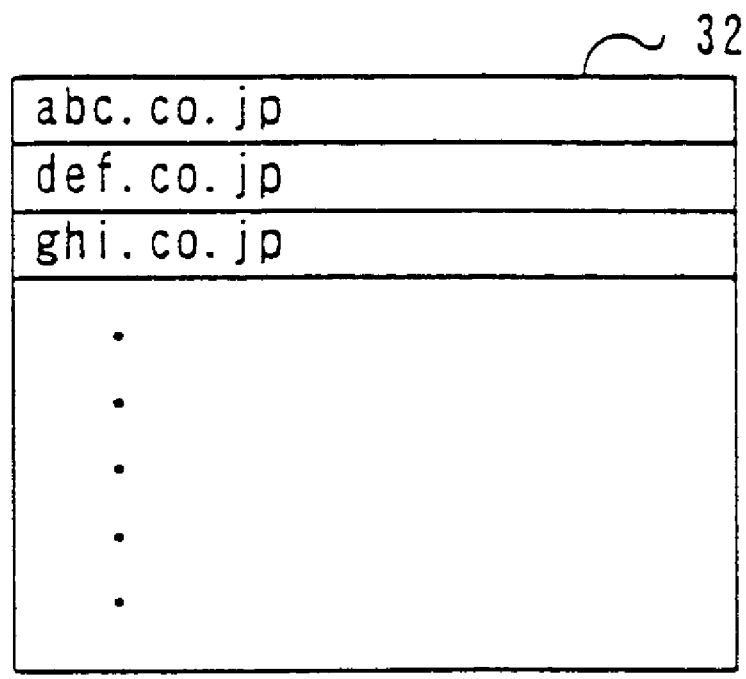
FIG. 6 is a schematic diagram illustrating a domain name management table in the above embodiment.

In addition, FIG. 6 is a schematic diagram illustrating the domain name management table 32. In the domain name management table 32, a domain name that is not necessary to be cyphered in transmitting the request file data, for example, a domain name belonging to the same fire wall as the internet facsimile apparatus 5 is registered.

Figure 7:
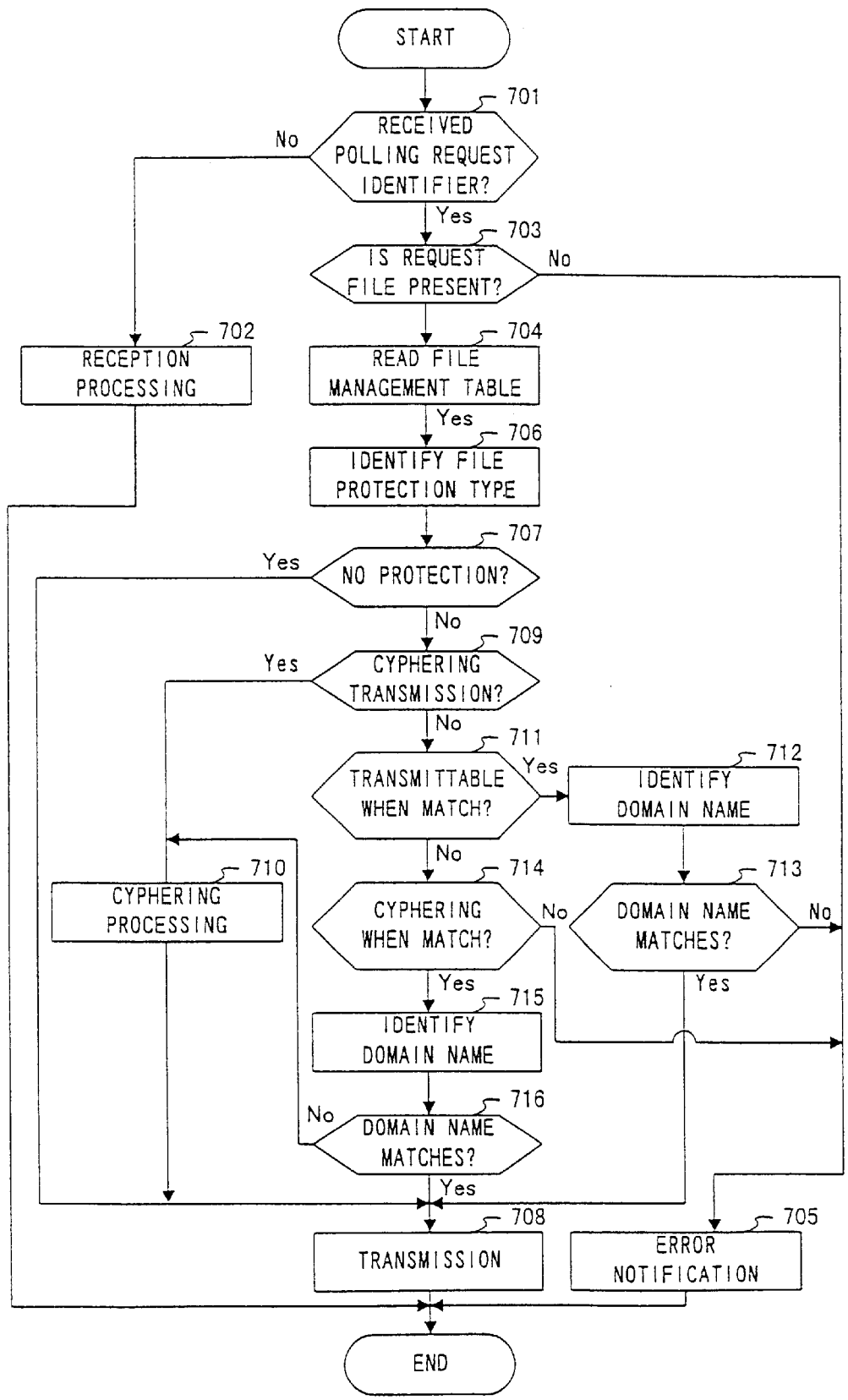
FIG. 7 is a flow chart illustrating an algorithm of decision processing performed by a decision section of the internet facsimile apparatus in the above embodiment.

Next, a polling transmission procedure in the internet facsimile apparatus 5 described above is explained in detail with reference to FIG. 7. FIG. 7 is a flow chart illustrating an algorithm of decision processing performed by the decision section 45.

In step (hereinafter referred to as ST) 701, a decision section 701 decides presence or absence of a polling request identifier based on the recognition result from the identifier recognition section 43. When an identifier is absence present, in ST702, reception processing is performed according to an ordinary E-mail communication procedure.

When an identifier is present, in ST703, based on the recognition result from the file recognition section 44, it is decided whether or not the file management table 31 contains a request file corresponding to the file number. When the request file is present, in ST704, data corresponding to the file number is read from the file storage area 33 in reference to the file management table 31. When the request file is not present, an error notification indicative of "no file" is executed in ST705, then the unusual end is performed.

When the request file is present, the protection type of the file is identified in ST706.

In ST707, it is decided whether or not the protection type is "no protection". When it is "no protection", a transmission is performed in ST708.

In ST709, it is decided whether or not the protection type is "cyphered transmission". When it is "cyphered transmission", the cyphering processing is executed in ST710 to transmit in ST708.

In ST711, it is decided whether or not the protection type is "transmittable when matched". When it is "transmittable when matched", ST712 identifies a domain name of a sender mail address from <reverse-path> in the MAIL command. In ST713, it is decided whether or not the domain name matches a domain name registered in the domain name management table 32. When the domain name matches the registered one, a transmission is performed in ST708. On the other hand, the domain name does not match the registered one, an error notification indicative of "internal use only" is executed in ST705, then the unusual end is performed.

In ST714, it is decided whether or not a protection type is "cyphering when not matched". When it is "cyphering when not matched", ST715 identifies a domain name of a sender mail address from <reverse-path> in the MAIL command. In ST716, it is decided whether the domain name matches a domain name registered in the domain name management table 32. When the domain name does not match the registered one, the cyphering processing is executed in ST710, and a transmission is performed in ST708. On the other hand, when the domain name matches the registered one, the cyphering processing is not executed, and a transmission is performed in ST708.

In addition, when the protection type can not be recognized by a failure of the file management table, an error notification indicative of "no file" is executed.

According to the above embodiment, the processing is executed to recognize a polling request identifier inserted in a recipient side mail address of <forward-path> in the RCPT command from the data receiving station 1 to decide, and when it is decided that the identifier is present, the request file is transmitted to the data receiving station 1 according to the polling communication procedure. Accordingly, the polling communication can be performed with a facsimile apparatus utilizing a network such as the internet 2, LAN 3 and others. In other words, the polling communication is able to be performed over the internet transfer protocol.

In addition, since the processing is also executed to recognize a request file number inserted in the mail address to decide, and specify request file data according to the file management table 31, it is possible to perform the polling communication based on only a mail recipient side address of <forward-path> in the RCPT command.

In addition, a protection type of requested image data is registered in the file management table 31 corresponding to the request file number. In other words, the request file number is also information concerning the protection type. The decision section 45 thereby can decides the protection type based on the request file number. Accordingly, it is possible to ensure the secrecy necessary for each request file data.

Figure 8:
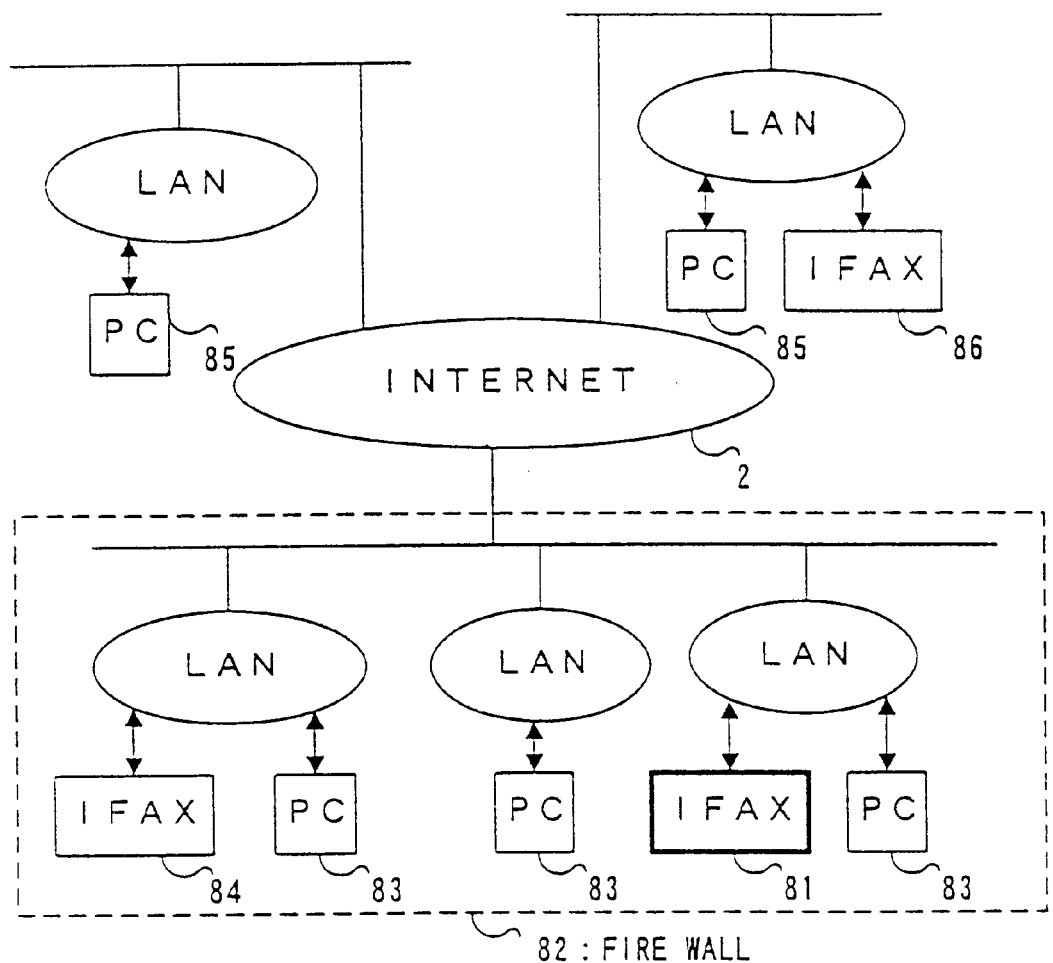
FIG. 8 is a network configuration diagram using the internet facsimile apparatus in the above embodiment.

In addition, since the protection type can be decided based on a domain name of a sender side mail address of <reverse-path> in the MAIL command using the domain name management table 32 so as to protect request file data corresponding to the decision result, it is possible to ensure an enough secrecy corresponding to a sender. Accordingly, as illustrated in FIG. 8, the internet facsimile apparatus 81 transmits request file data without cyphering when a polling request is performed from a PC 83 and a facsimile apparatus 84 that are in the same fire wall 82. On the other hand, the internet facsimile apparatus 81 transmits a request file cyphering or refuses to a polling request when the polling request is performed from a PC 85 and an internet facsimile apparatus 86 out of the fire wall 82. According to the embodiment of the present invention, it is thus possible to alter a protection type based on domain names, thereby making it possible to ensure the higher secrecy appropriate for the internet characteristics in a polling communication.

Further, since usual E-mail software can be used in the data receiving station 1, it is not necessary to prepare a particular apparatus and software.

The present invention is not limited by the above embodiment. For example, a request file number is inserted in <forward-path> in the RCPT command along with a polling request identifier in the above embodiment. However, information concerning the request file may be transmitted by other manner to the internet facsimile apparatus 5. For example, the information may be inserted in mail data following DATA command in SMTP.

In addition, SMTP is explained as an example for a message transfer protocol of E-mail in the above embodiment. However, other protocols may be available.

In addition, the above embodiment describes about the case where a request file is transmitted to the data receiving station 1. However, in the case where the data receiving station 1 designates a mail address of another communication apparatus in <reverse-path> in the MAIL command, it is possible to transfer request file data to the another apparatus.

In addition, the above embodiment describes about the case where the present invention is applied in the internet facsimile 5. However, the present invention is also applicable to a server for receiving image data from a client to distribute to other clients.

In addition, the present invention includes a memory medium to store a program that is executed by CPU, so as to perform the same processes that are performed by the internet facsimile 5 of the above embodiment. Further the present invention is applicable to a PC for executing the program stored at the memory medium with a scanner connected and a communication network section further comprised.

According to the present invention, it is possible to perform a polling communication in a communication apparatus for transmitting and receiving data via the internet, while keeping the secrecy corresponding to needs in a polling transmission.

The present invention is not limited to the above described embodiments, and various variations and modifications may be possible without departing from the scope of the present invention.

This application is based on the Japanese Patent Application No. HEI10-66226 filed on Mar. 2, 1998, entire content of which is expressly incorporated by reference herein.

What is claimed is:

1. A communication apparatus connected to the Internet, comprising:
    a memory that stores a plurality of image data, each image data corresponding to a file number;
    an electronic mail receiver that receives electronic mail, including sender information, in accordance with a message transfer protocol of electronic mail via the Internet;
    a detector that detects whether or not a polling request identifier, which indicates a request for a polling transmission, and a request file number, which identifies image data stored in said memory, are included in the electronic mail received by said electronic mail receiver; and
    a transmitter that, when said detector detects the polling request identifier and the request file number, retrieves image data identified by the request file number from said memory, transmits the retrieved image data to a sender identified by the sender information, via the Internet.

2. The communication apparatus according to claim 1, further comprising a scanner that scans a document to store the image data into said memory.

3. The communication apparatus according to claim 1, further comprising a facsimile transmitter that transmits the image data scanned by said scanner via a public switching telephone network.

4. The communication apparatus according to claim 1, wherein the polling request identifier and the request file number are included in a user area of the electronic mail.

5. The communication apparatus according to claim 1, further comprising a cyphering section that performs a cyphering process to the retrieval image data before said transmitter transmits the retrieved image data.

6. The communication apparatus according to claim 1, wherein, when said detector detects only the polling request identifier but not the request file number, said transmitter transmits an error notification.

7. The communication apparatus according to claim 1, further comprising a domain name management table that stores a plurality of domain names, wherein when the sender information comprises one of the domain names in said domain name management table, said transmitter transmits image data to the sender.

8. The communication apparatus according to claim 1, wherein when the sender information does not comprise one of the domain names in said domain name management table, said transmitter transmits an error notification.

9. A communication method for using a communication apparatus connected to the Internet, comprising:
    storing a plurality of image data into a memory, each image data corresponding to a file number;
    receiving electronic mail, including sender information, in accordance with a message transfer protocol of electronic mail via the Internet;
    detecting whether or not a polling request identifier, which indicates a request for a polling transmission, and a request file number, which identifies image data stored in the memory, are included in the received electronic mail;
    retrieving image data identified by the request file number from the memory when the polling request identifier and the request file number are detected; and
    transmitting the retrieved image data to a sender identified by the sender information, via the Internet.

10. The communication method according to claim 9, further comprising cyphering the image data before the image data is transmitted.

11. A communication apparatus connected to the Internet, comprising:
    a scanner configured to scan a document to obtain image data;
    a converter that converts the image data obtained by said scanner into a TIFF file;
    a memory configured to store a plurality of TIFF files converted by said converter, a file number being associated with each image data;
    an electronic mail receiver that receives electronic mail from an Internet communication apparatus, the electronic mail requesting reception of a TIFF file stored in said memory, in accordance with an SMTP protocol via the Internet, the electronic mail including an address of the Internet communication apparatus, a polling request identifier which indicates a request for receiving a TIFF file stored in said memory, and a request file number;
    a detector that detects whether or not the polling request identifier and the request file number are included in the electronic mail received by said electronic mail receiver; and
    an electronic mail transmitter that, when said detector detects the polling request identifier and the request file number, retrieves a TIFF file identified by the request file number from said memory and transmits the retrieved TIFF file to the Internet communication apparatus identified by the address included in the received electronic mail.

* * * * *